United States Patent [19]
Uleski et al.

[11] Patent Number: 5,773,776
[45] Date of Patent: Jun. 30, 1998

[54] STEERING WHEEL ASSEMBLY

[75] Inventors: Michael A. Uleski, Roseville; Thomas J. Allard, Walled Lake, both of Mich.

[73] Assignee: UT Automotive Dearborn, Inc., Dearborn, Mich.

[21] Appl. No.: 733,948

[22] Filed: Oct. 21, 1996

[51] Int. Cl.$^6$ ............................ H01H 3/16; H01R 39/00; B60Q 1/42
[52] U.S. Cl. .................. 200/61.27; 200/61.3; 439/15
[58] Field of Search ....................... 210/61.27, 61.38, 210/61.54, 61.57; 439/15–17, 162–165; 74/484 R

[56] References Cited

U.S. PATENT DOCUMENTS

| | | | |
|---|---|---|---|
| 4,426,951 | 1/1984 | Nishizima | 200/61.35 X |
| 5,046,951 | 9/1991 | Suzuki | 439/15 |
| 5,144,860 | 9/1992 | Furuhashi et al. | 200/61.54 X |
| 5,242,309 | 9/1993 | Hasegawa | 439/164 X |
| 5,450,769 | 9/1995 | Hu et al. | 439/15 X |
| 5,460,535 | 10/1995 | Bolen | 439/164 |
| 5,496,978 | 3/1996 | Umezawa et al. | 200/61.3 |
| 5,575,177 | 11/1996 | Poleschuk et al. | 74/484 R |
| 5,588,854 | 12/1996 | Ikumi et al. | 439/164 |
| 5,651,687 | 7/1997 | DuRocher et al. | 439/15 X |

*Primary Examiner*—J. R. Scott
*Attorney, Agent, or Firm*—Howard & Howard

[57] ABSTRACT

A steering wheel assembly includes a steering wheel mounted on an outer end of a steering shaft. The steering shaft extends at least partially into a clock spring housing having a rotor rotatably disposed at least partially in the clock spring housing. A lower portion of the rotor includes at least one cancel cam extending radially from its outer surface. A wire ribbon is coiled about an upper portion of the rotor within the clock spring housing. Rotation of the rotor by the steering wheel causes the cancel cam to contact a cancel member of a turn signal switch, thereby returning the turn signal switch from an activated position to a deactivated position.

14 Claims, 4 Drawing Sheets

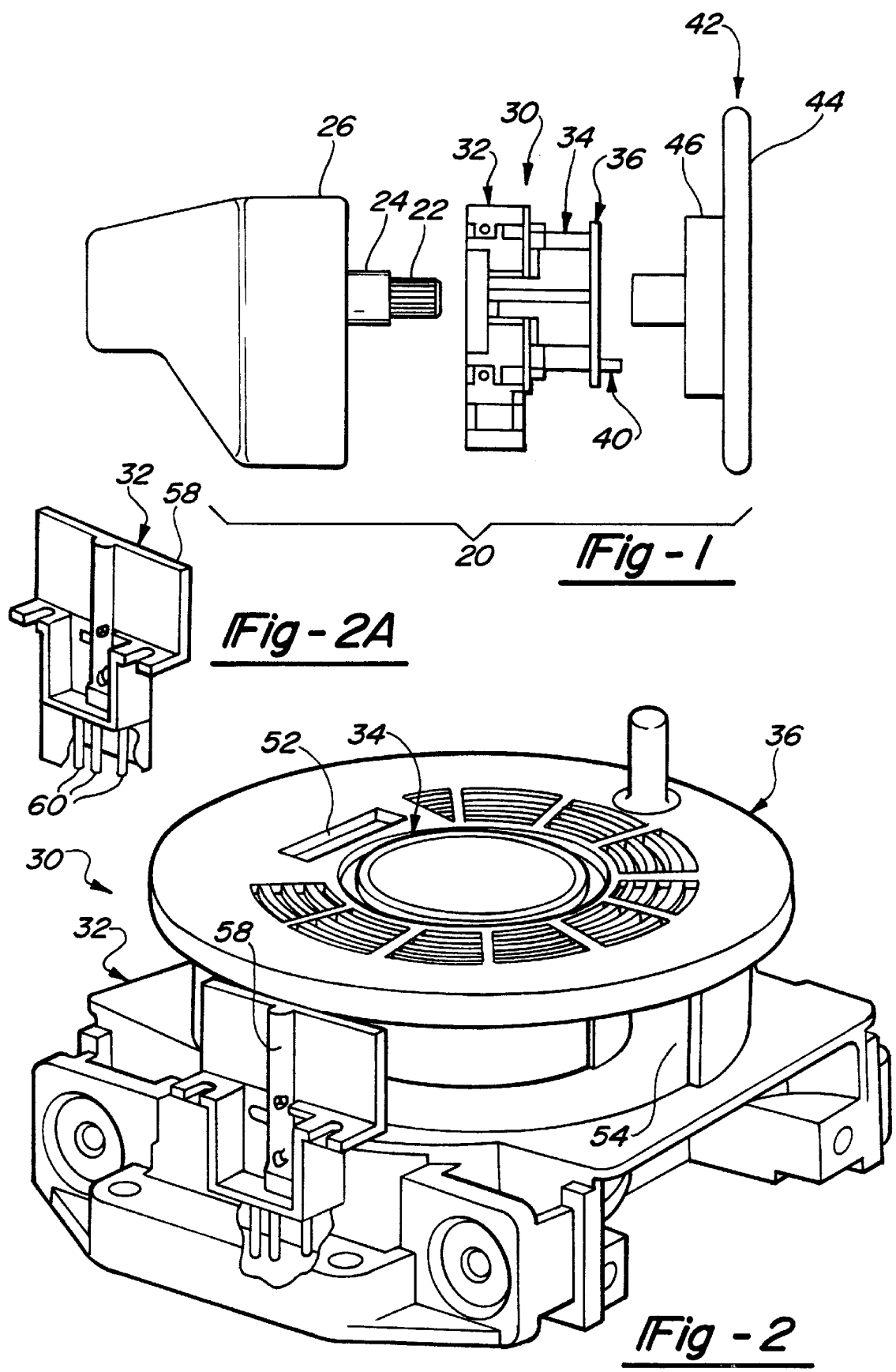

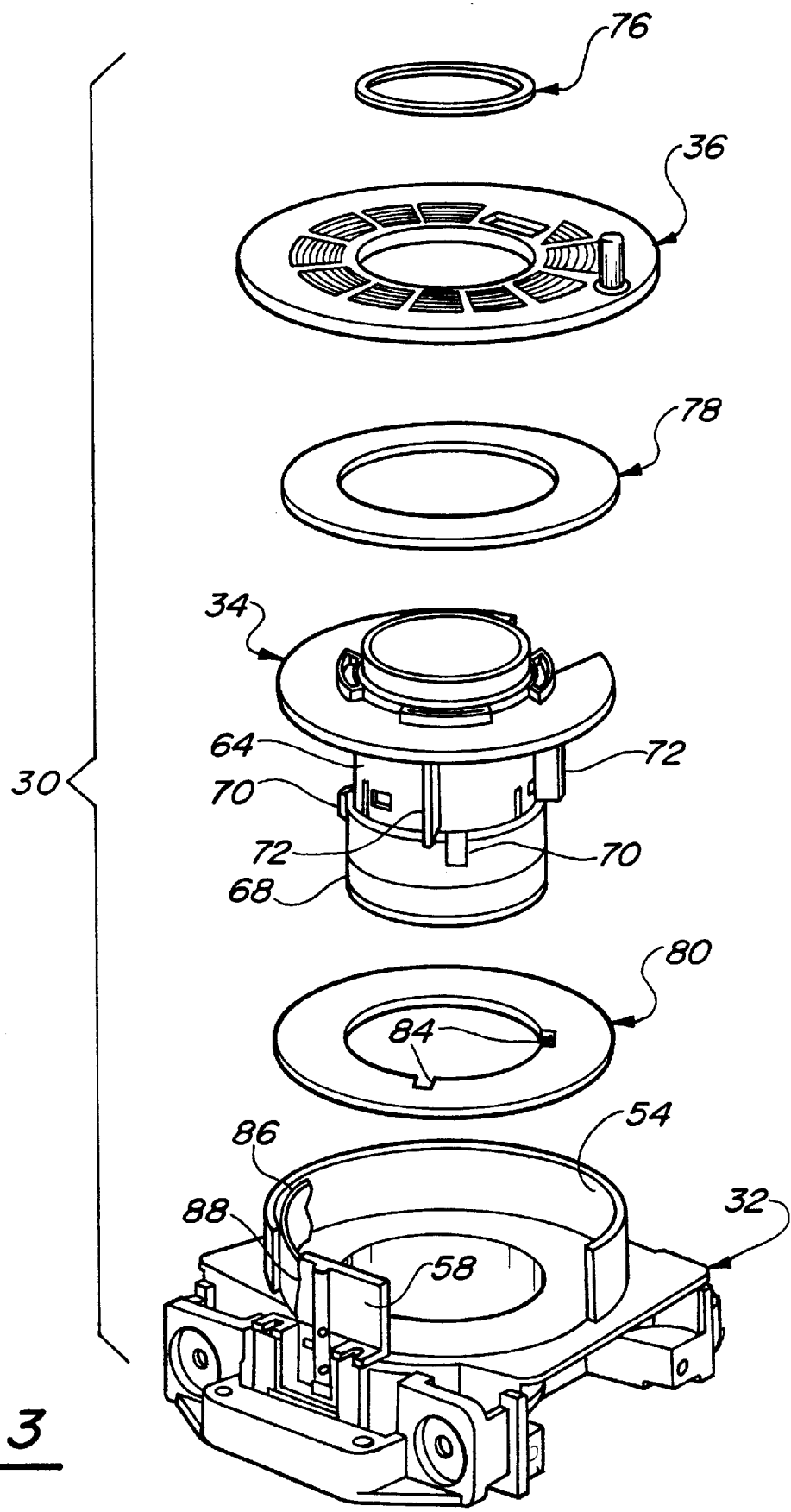
_Fig - 3_

5,773,776

STEERING WHEEL ASSEMBLY

BACKGROUND OF THE INVENTION

The present invention relates to a steering wheel assembly and more particularly to a steering wheel assembly having an integrated rotor and turn signal cancel cam.

Many current steering wheel assemblies include a wire ribbon providing an electrical connection between the rotatable steering wheel and a clock spring housing which is non-rotatably mounted on the vehicle. Generally a rotor is secured to the steering wheel. The wire ribbon is loosely coiled about the rotor numerous times. During rotation of the steering wheel, the coil of the wire ribbon is expanded and contracted about the rotor. In this manner, electrical connections between the rotating steering wheel are provided to the vehicle.

The known steering wheel assembly further includes an annular cancel cam rotor, which is generally spring biased toward the rotating steering wheel. The cancel cam rotor includes several projections extending toward the steering wheel such that the cancel cam rotor is rotatably driven by the steering wheel. The cancel cam rotor further includes at least one cancel cam lobe extending radially outwardly. Upon rotation of the steering wheel and cancel cam rotor, the cancel cam lobe engages a cancel member on a turn signal switch to return the turn signal switch from an activated to a deactivated position. The known assembly requires numerous parts to be assembled including the cancel cam rotor and a spring for biasing the cancel cam motor against the steering rim and hub assembly.

SUMMARY OF THE INVENTION

The present invention provides a steering wheel assembly including a clock spring assembly having a one-piece rotor. The rotor includes an upper portion about which a wire ribbon is coiled and a lower portion from which cancel cams extend radially to deactivate a turn signal switch. The steering wheel assembly of the present invention provides simpler assembly with fewer parts.

A clock spring housing is non-rotatably mounted in the vehicle. The clock spring housing defines a generally cylindrical first orifice through which the steering shaft is at least partially inserted. A one piece rotor assembly is rotatably mounted in the clock spring housing about the steering shaft. A lower portion of the rotor includes cancel cams for deactivating a turn signal switch mounted in the clock spring housing.

An annular cavity is defined between the rotor and a portion of the cylindrical orifice through the clock spring housing. A flexible wire ribbon is coiled about an upper portion of the rotor within the annular cavity. The wire ribbon provides an electrical connection between the rotating steering wheel and a connector which is insert-molded in the clock spring housing. Preferably the outer circumference of the upper portion of the rotor includes a plurality of ribs extending radially outwardly in order to increase the diameter about which the wire ribbon is coiled.

An annular plate is preferably disposed within the annular cavity and positioned between the cancel cam and the wire ribbon. The inner diameter of the annular plate is preferably only slightly larger than the outer circumference of the rotor. Preferably, an inner circumference of the annular plate includes notches through which the cancel cams can be inserted. During assembly, the lower portion of the rotor is inserted through the annular plate, with the cancel cam passing through the notches. Alternatively, the rotor can initially be formed as a separate upper portion and lower portion, where the upper portion is first inserted at least partially into the annular plate and the lower portion is subsequently secured to the upper portion, such that the annular plate is disposed between the cancel cams and the wire ribbon.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is an exploded view of the steering wheel assembly of the present invention;

FIG. 2 is an assembled perspective view of the clock spring assembly of FIG. 1, with the clock spring housing partially broken away;

FIG. 2A is an enlarged view of a portion of the clock spring housing of FIG. 2, partially broke away;

FIG. 3 is an exploded perspective view of the clock spring assembly of FIG. 2, partially broken away;

DETAILED DESCRIPTION OF A PREFERRED EMBODIMENT

Figure 4:
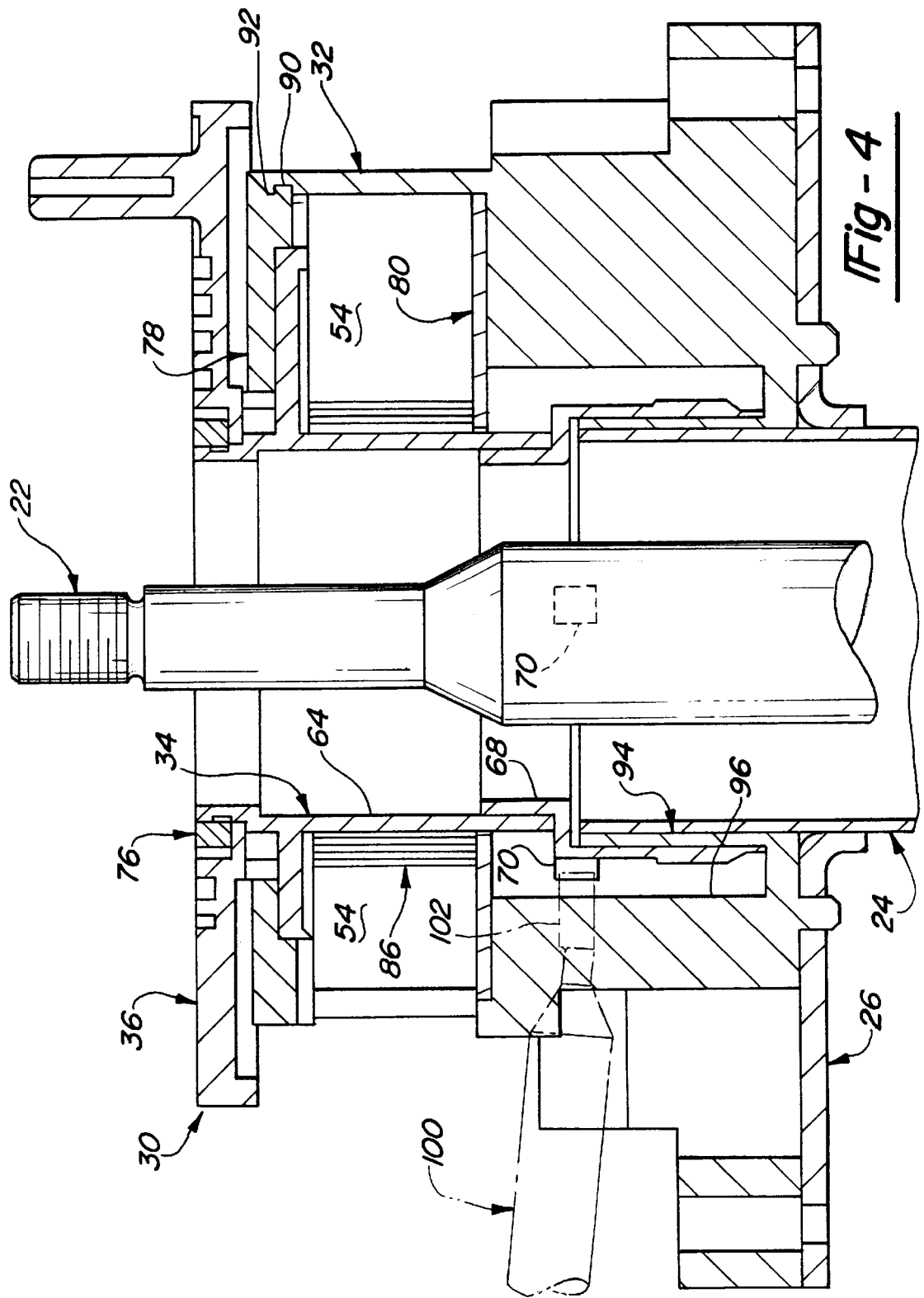
FIG. 4 is a sectional view taken along lines 4—4 of FIG. 2.

A steering wheel assembly 20 according to the present invention includes a steering shaft 22 rotatable within a steering column tube 24 and outer cover 26. A clock spring assembly 30 includes a clock spring housing 32 having a rotor 34 and actuator 36 rotatably mounted in the clock spring housing 32. The actuator 36 includes an engagement pin 40 for being rotatably driven by a steering wheel hub assembly 42. The steering wheel hub assembly 42 includes a steering wheel rim 44 and hub 46.

As can be seen in FIG. 2, the clock spring assembly 30 includes the actuator 36 and rotor 34 rotatably mounted in the clock spring housing 32. The actuator 36 preferably includes an aperture 52 for receiving an electrical connector for connecting to the steering wheel hub assembly 42. An annular cavity 54 is defined between the rotor 34 and the clock spring housing 32 for retaining a flexible wire ribbon (FIGS. 3 and 4) coiled about the rotor 34. A first end of the wire ribbon connects through the aperture 52 in the actuator 36 to the steering wheel hub assembly 42. A second end of the wire ribbon is connected via an integral connector 58 to the vehicle.

The integral connector 58 is more clearly shown in FIG. 2A. The integral connector 58 comprises a plurality of connector pins 60 which are insert-molded into the connector 58. The integral connector 58 is preferably over-molded onto a first end of the wire ribbon, which makes electrical contact with the connector pins 60. The integral connector 58 is preferably mounted on the clockspring housing 32 by mounting screws or by snap-fit tabs.

Referring to FIG. 3, the rotor 34 preferably comprises an upper rotor portion 64 and a lower rotor portion 68. The upper and lower rotor portions 64, 68 are preferably molded separately and subsequently connected by a snap-fit, adhesive or other known methods. The lower rotor portion 68 preferably includes two cancel cams 70 extending radially from the lower rotor portion 68 and spaced circumferentially approximately 120°. The upper rotor portion preferably includes three ribs 72 extending radially outwardly from the upper rotor portion 64 and spaced circumferentially 120°.

The clock spring assembly 30 further includes a lock ring 76 for securing the actuator 36 to the upper rotor portion 64. A rotor cover 78 generally comprising an annular plate includes tabs to be snap-fit into the clock spring housing 32 to secure the rotor 34 rotatably within the clock spring housing 32. A lower annular plate 80 has an inner diameter slightly greater than the outer diameter of the rotor 34. The annular plate 80 further includes two notches 84 on its inner circumference spaced 120°.

A wire ribbon 86 (only a portion of which is shown) is coiled about the rotor 34 within the annular cavity 54. A first end 88 of the wire ribbon 86 is connected to the connector pins 60 in the integral connector 58.

Referring to FIG. 4, the clock spring assembly 30 is mounted to the outer cover 26 of the vehicle, inserting the steering shaft 22 through the clock spring housing 32, rotor 34 and actuator 36 and inserting the steering column tube 24 at least partially into the clock spring housing 32 and rotor 34. The rotor 34 and actuator 36 are rotated in the clock spring housing 32 by the steering wheel hub assembly 42. The rotor 34 is retained within the clock spring housing 32 by the rotor cover 78 which includes a plurality of tabs 90 which are snap-fit into notches 92 in the clock spring housing 32. The actuator 36 is retained by the lock ring 76 secured to the upper rotor portion 64. Alternatively, the actuator 36 can be secured to the upper rotor portion 64 by a four-point heat stake, or other methods known in the relevant art. The wire ribbon 86 is coiled about the upper rotor portion 64 in the annular cavity 54 between the rotor cover 78 and annular plate 80. The lower rotor portion 68 is rotatably mounted on a rotor hub portion 94 of the clock spring housing 32, which defines a lower annular cavity 96 below the annular plate 80. The annular plate 80 is secured by adhesive or other means over the lower annular cavity 96 to prevent the wire ribbon 86 from falling into the lower annular cavity 96.

A turn signal switch 100 is mounted in the clock spring housing 32. As is well known, the turn signal switch 100 includes a right turn signal activated position, a left turn activated position and a centered deactivated position. The turn signal switch 100 includes a cancel member 102 extending generally toward the lower rotor portion 68 within the lower annual cavity 96.

Figure 5:
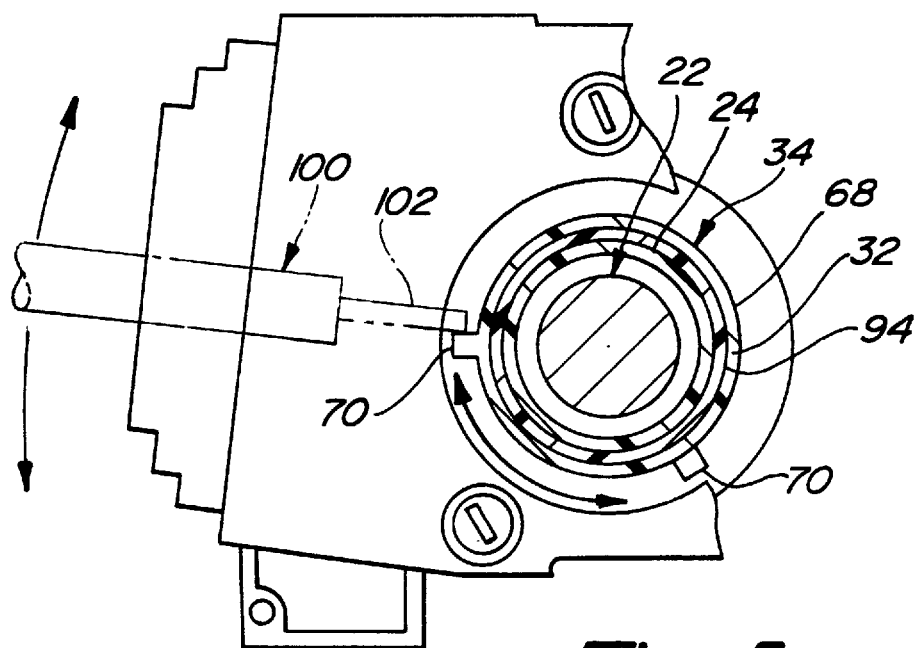
FIG. 5 is a view illustrating the details of a turn sign switch and the cancelling mechanism.

As shown in FIG. 5, when the turn signal switch 100 is in either activated position, rotation of the rotor 34 will cause a cancel cam 70 to contact the cancel member 102, thereby returning the turn signal switch 100 to a deactivated position. The details of the turn signal switch 100 and its interaction with a cancel cam one well known.

During assembly, the lower rotor portion 68 can be inserted through the annular plate 80 by aligning the cancel cams 70 with the notches 84. Alternatively, by inserting one of the upper rotor portion 64 and the lower rotor portion 68 at least partially through the annular plate 80 prior to connecting the upper rotor portion 64 to the lower rotor portion 68, the notches 84 can be eliminated.

In accordance with the provisions of the patent statutes, the present invention has been described in what is considered to represent a preferred embodiment. However, it should be noted that the invention can be practices otherwise than as specifically illustrated and described without departing from its spirit or scope.

What is claimed is:

1. A steering wheel assembly comprising:

a steering wheel mounted on an outer end of a steering shaft on a vehicle;

a clockspring housing mounted on said vehicle, said steering shaft extending at least partially into said clockspring housing;

a rotor rotatably mounted in said clockspring housing, said rotor having at least one cancel cam on an outer surface of said rotor, said rotor being driven rotatably by said steering wheel;

a wire ribbon electrically connecting said steering wheel to said vehicle, said ribbon being coiled about said rotor;

a turn signal switch mounted on said clockspring housing, said turn signal switch having a cancel member extending generally toward said rotor, said turn signal switch having an activated position and a deactivated position, wherein rotation of said steering wheel causes said cancel cam on said rotor to contact said cancel member on said turn signal switch, thereby returning said turn signal switch from said activated position to said deactivated position.

2. The steering wheel assembly of claim 1 further including:

a plurality of pins insert-molded in said clockspring housing, said pins connecting said ribbon to said vehicle.

3. The steering wheel assembly of claim 1 wherein said rotor comprises an upper portion and a lower portion, said ribbon being coiled about said upper portion, said lower portion including said cancel cam, said first portion and said second portion being formed as separate items, said first portion being secured to said second portion.

4. The steering wheel assembly of claim 3 wherein said first portion and said second portion snap-fit together to form said rotor.

5. The steering wheel assembly of claim 3 wherein said upper rotor portion further includes a plurality of ribs extending radially from an outer circumference of said upper rotor portion said wire ribbon coiled about said plurality of ribs.

6. The steering wheel assembly of claim 1 further including an annular plate having an aperture disposed within said clockspring housing, said rotor disposed within said aperture in said annular plate, said annular plate disposed between said at least one cancel cam and said wire ribbon.

7. The steering wheel assembly of claim 6 wherein said annular plate includes at least one notch on an inner circumference for accommodating said at least one cancel cam during insertion of said rotor into said aperture in said annular plate during assembly.

8. A clockspring assembly for a vehicle steering wheel comprising:

a clockspring housing;

a rotor rotatably disposed at least partially in said clockspring housing, said rotor having at least one cancel cam on an outer surface of said rotor, said rotor and said clockspring housing defining an annular cavity therebetween;

a wire coiled about said rotor and disposed substantially within said annular cavity;

a turn signal switch mounted on said clockspring housing and having a cancel member extending generally toward said rotor, said turn signal switch having an activated position and a deactivated position, wherein rotation of said rotor causes said cancel cam on said rotor to contact said cancel member on said turn signal switch, thereby returning said turn signal switch from said activated position to said deactivated position.

9. The clockspring assembly of claim 8 further including:

a plurality of pins insert-molded in said clockspring housing, said pins connecting said wire to said clockspring housing.

10. The clockspring assembly of claim 8 wherein said rotor comprises an upper portion and a lower portion, said wire being coiled about said upper portion, said lower portion including said cancel cam, said first portion and said second portion being formed as separate items, said first portion being secured to said second portion.

11. The clockspring assembly of claim 10 wherein said first portion and said second portion snap-fit together to form said rotor.

12. The clockspring assembly of claim 10 wherein said upper rotor portion further includes a plurality of ribs extending radially from an outer circumference of said upper rotor portion said wire coiled said plurality of ribs.

13. The clockspring assembly of claim 8 further including an annular plate having an aperture disposed within said clockspring housing, said rotor disposed within said aperture in said annular plate, said annular plate disposed between said at least one cancel cam and said wire ribbon.

14. The clockspring assembly of claim 13 wherein said annular plate includes at least one notch on an inner circumference for accommodating said at least one cancel cam during insertion of said rotor into said aperture in said annular plate during assembly.

\* \* \* \* \*